H. A. HANCOCK.
STRAW BINDING HARVESTER.
APPLICATION FILED NOV. 22, 1909.
997,552. Patented July 11, 1911.
7 SHEETS—SHEET 2.
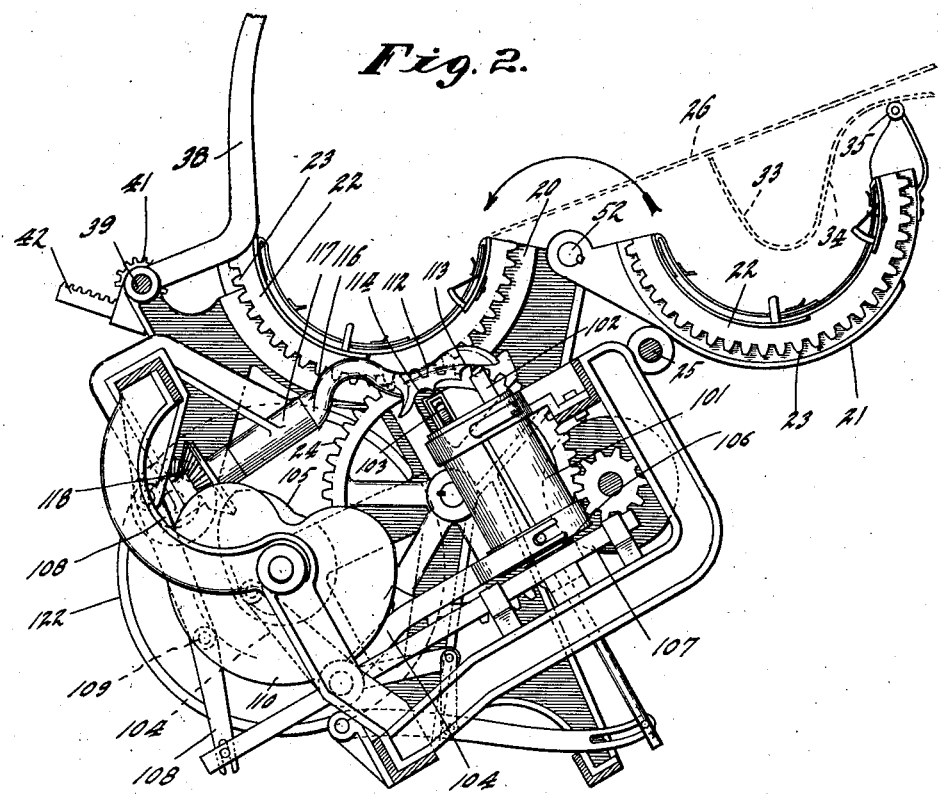
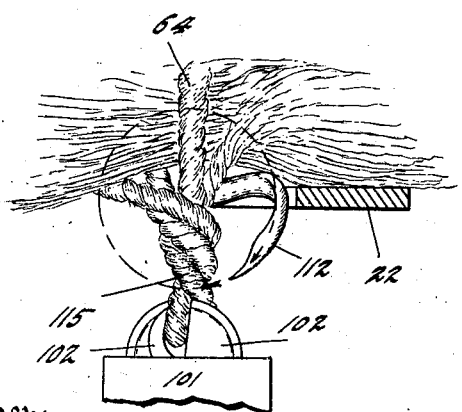
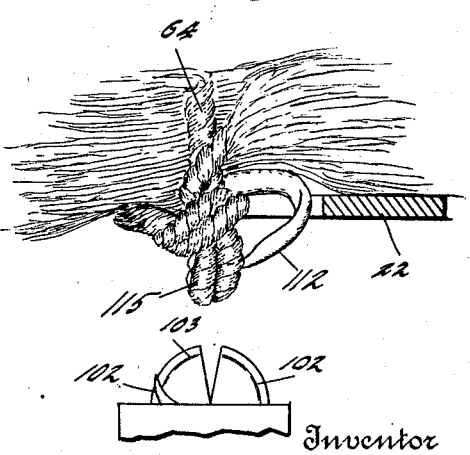

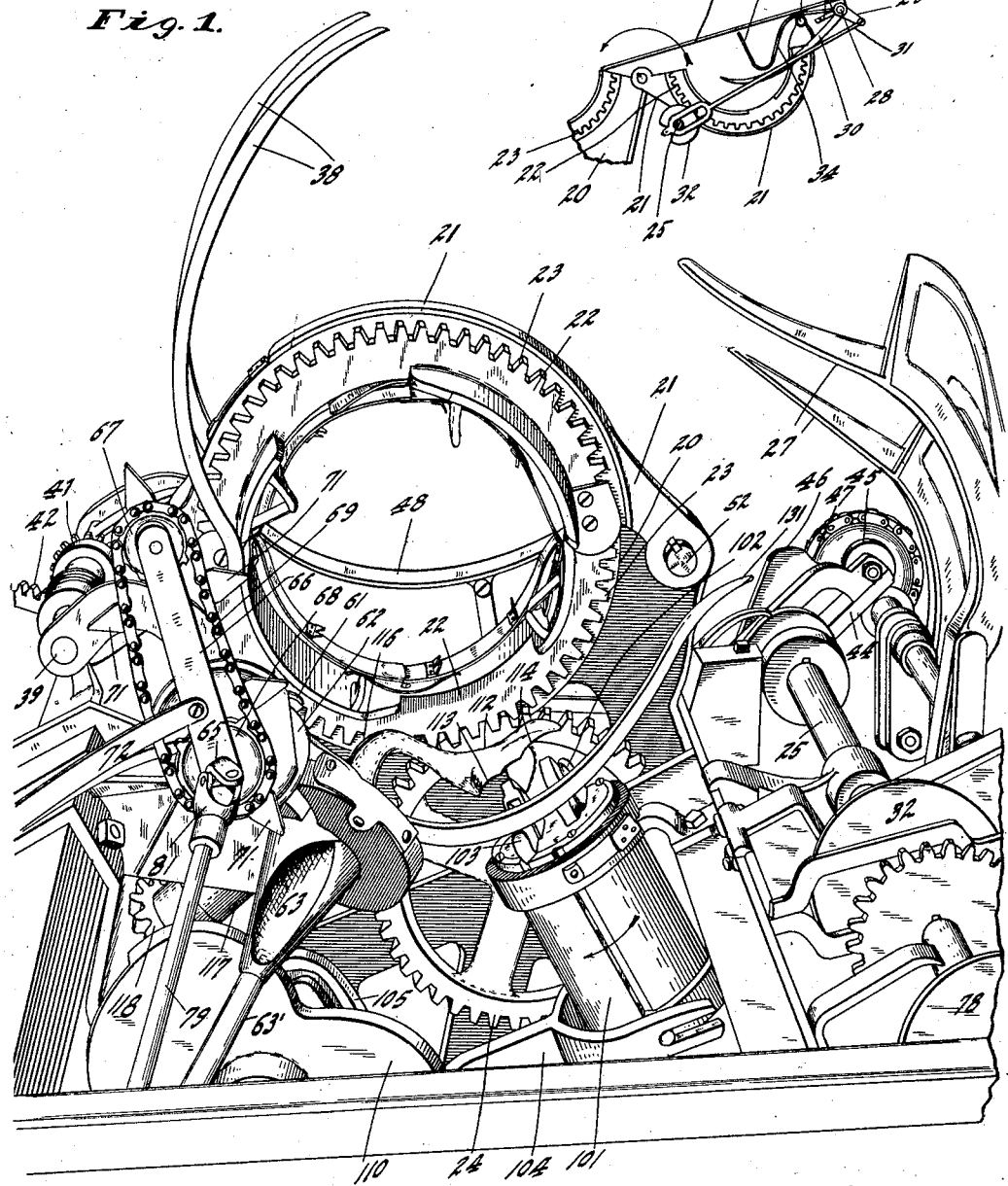

H. A. HANCOCK.
STRAW BINDING HARVESTER.
APPLICATION FILED NOV. 22, 1909.

997,552.

Patented July 11, 1911.

7 SHEETS—SHEET 3.

Witnesses
Frank A. Fahle
Thomas W. McMeans

Inventor
Harry A. Hancock,
By Bradford Hood
Attorneys

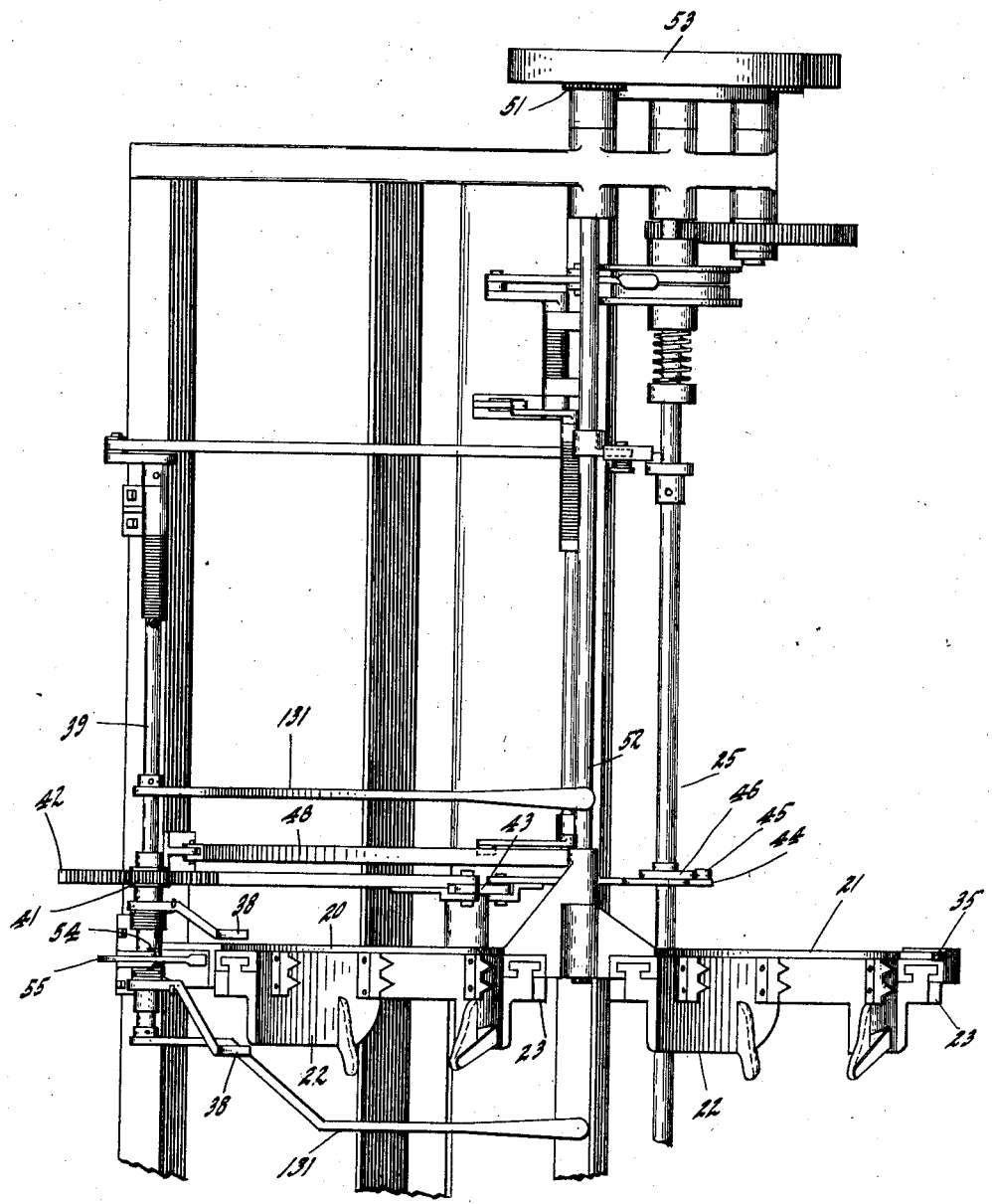

H. A. HANCOCK.
STRAW BINDING HARVESTER.
APPLICATION FILED NOV. 22, 1909.
997,552.
Patented July 11, 1911.
7 SHEETS—SHEET 5.
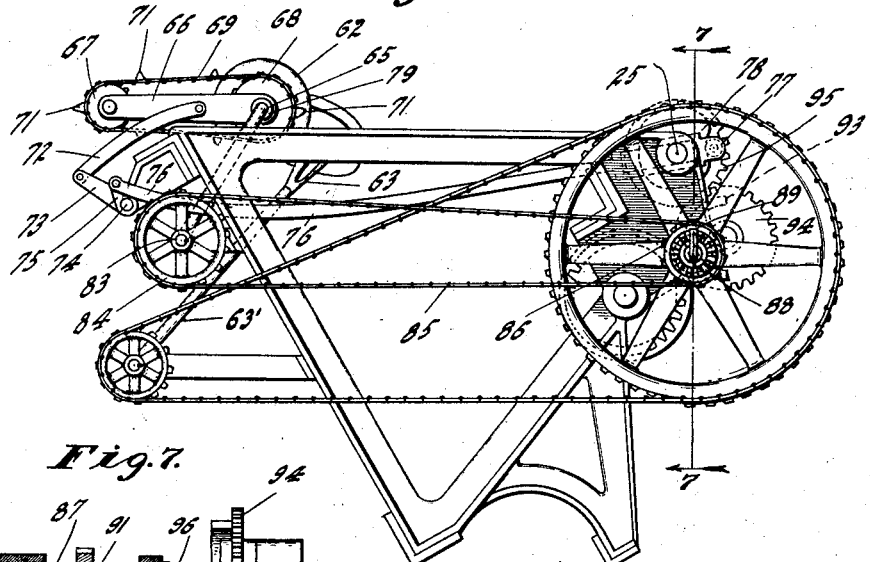
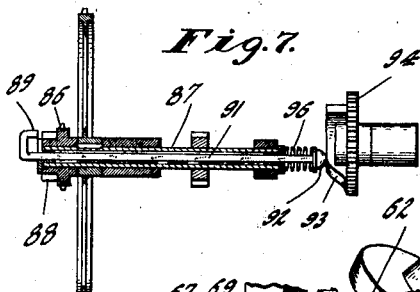
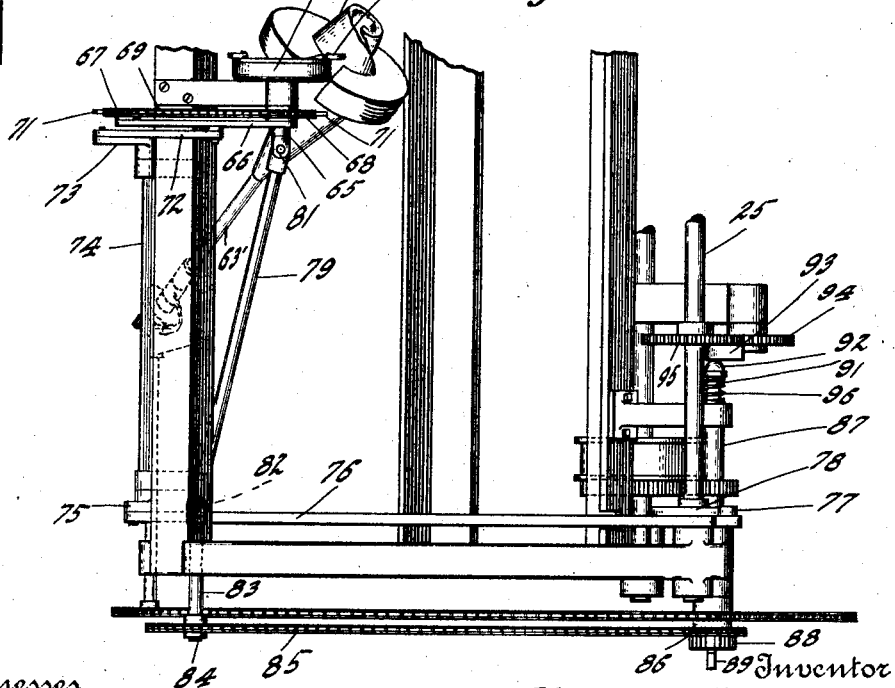
Witnesses
Frank A. Fahle
Thomas W. McMeans
Inventor
Harry A. Hancock,
By Bradford Hood
Attorneys H. A. HANCOCK.
STRAW BINDING HARVESTER.
APPLICATION FILED NOV. 22, 1909.
997,552.
Patented July 11, 1911.
7 SHEETS—SHEET 6.
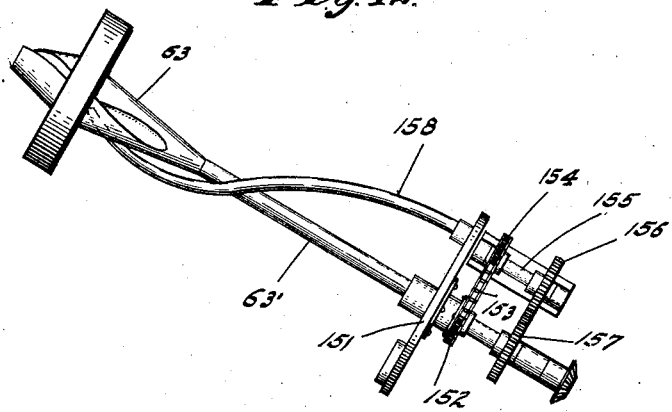
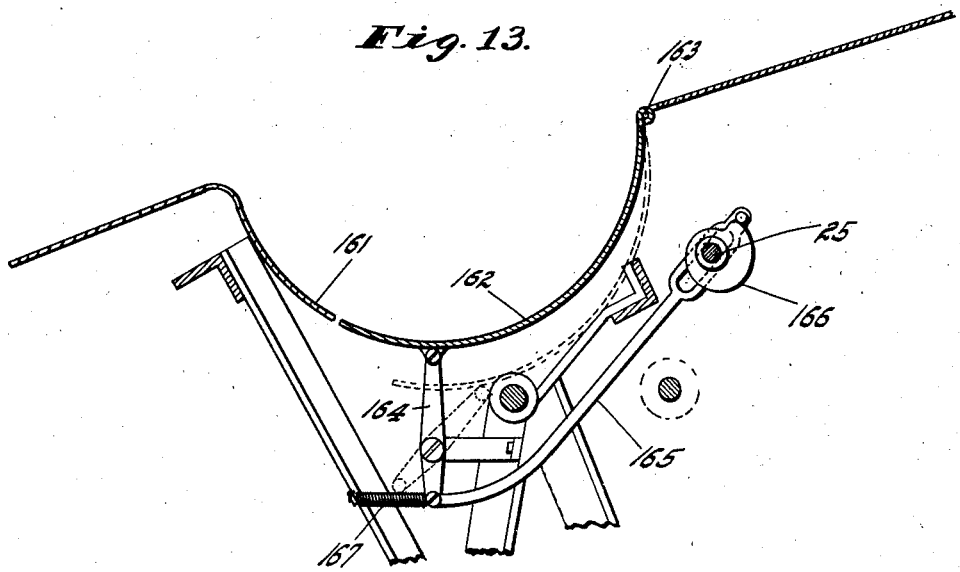

H. A. HANCOCK.
STRAW BINDING HARVESTER.
APPLICATION FILED NOV. 22, 1909.
997,552.
Patented July 11, 1911.
7 SHEETS—SHEET 7.
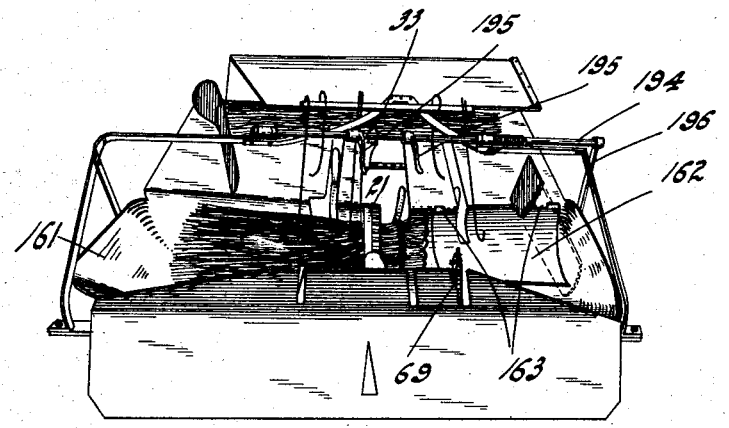
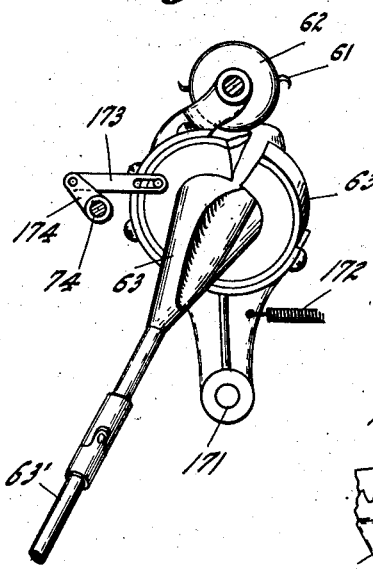
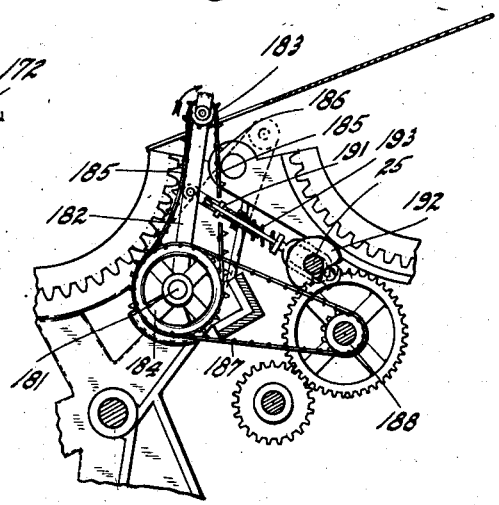
Witnesses
Frank A. Fahle
Thomas W. McMeans
Inventor
Harry A. Hancock,
By Bradford Hood
Attorneys

UNITED STATES PATENT OFFICE.

HARRY A. HANCOCK, OF INDIANAPOLIS, INDIANA, ASSIGNOR TO THE BROWN STRAW BINDER COMPANY, OF INDIANAPOLIS, INDIANA, A CORPORATION OF INDIANA.

STRAW-BINDING HARVESTER.

997,552.  Specification of Letters Patent.  Patented July 11, 1911.

Application filed November 22, 1909. Serial No. 529,289.

*To all whom it may concern:*

Be it known that I, HARRY A. HANCOCK, a citizen of the United States, residing at Indianapolis, in the county of Marion and State of Indiana, have invented certain new and useful Improvements in Straw-Binding Harvesters, of which the following is a specification.

The object of my invention is to produce certain improvements in details of construction of a harvester capable of receiving freshly cut straw and combining the same into bundles by means of a straw rope formed from the butt ends of the straws of the bundle.

My improvements have been especially designed for use in conjunction with or the development of the mechanism shown clearly in my Patent No. 864,783, although not necessarily limited to such use, and I have therefore omitted, from the drawings in the present case, many of the details which are common to the two mechanisms.

The accompanying drawings illustrate my invention.

Figure 3:
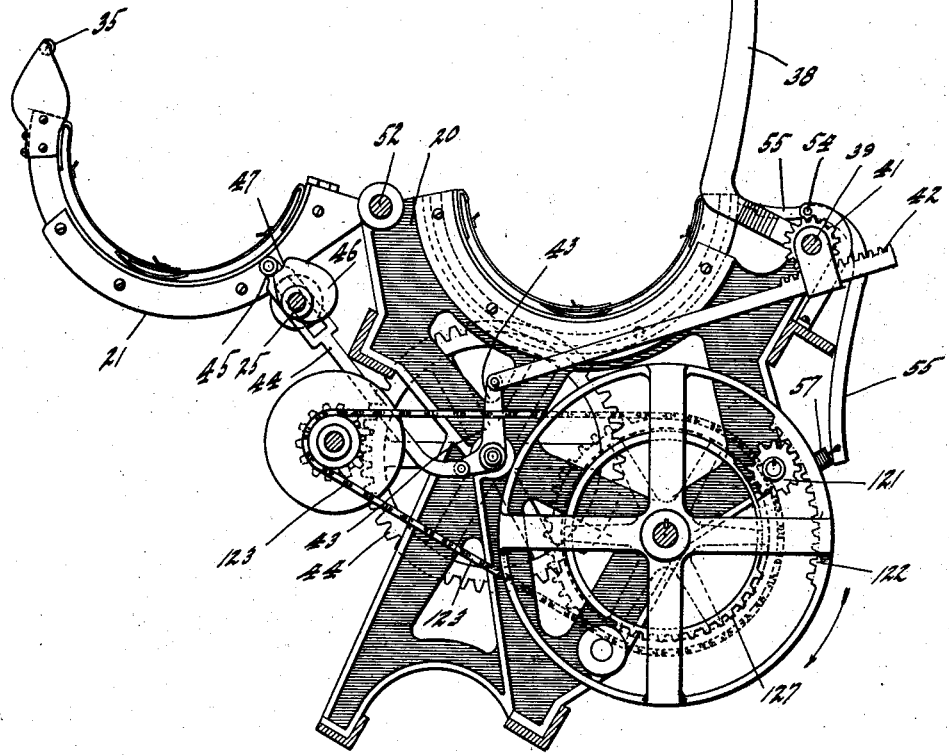
Figure 4:
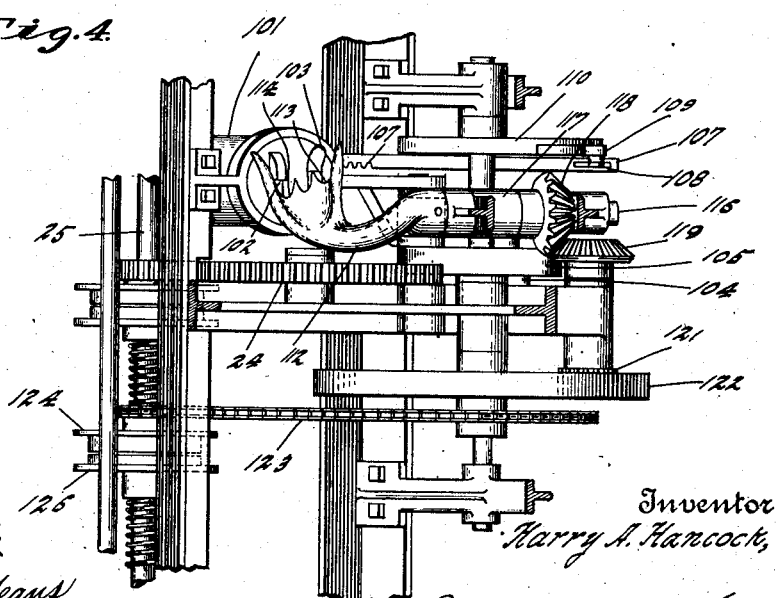

Figure 1 is a fragmentary perspective showing the bundle-forming ring, the gathering and rope-forming mechanism, the tying head, the straw holder, and associated parts; Fig. 2 a transverse section immediately adjacent the knotting mechanism; Fig. 3 a transverse section on the side of the binder ring opposite the knotting mechanism; Fig. 4 a plan of the knotting mechanism and adjacent parts; Fig. 5 a fragmentary plan showing the bundle ring open and showing the bundle ejecting arms and operating mechanism therefor, a considerable number of the elements being omitted for the sake of clearness; Fig. 6 a fragmentary plan of the rope-forming mechanism and adjacent parts; Fig. 7 a sectional detail of the clutch mechanism for controlling the movement of the straw holding chain; the section being taken on line 7 7 of Fig. 8; Fig. 8 an end elevation of the parts shown in Fig. 6; Fig. 9 a detail of the means for stopping the flow of straw to the bundle ring; Fig. 10 a detail of the twist of the binding rope, and the adjacent tucker finger in initial position; Fig. 11 a similar detail showing the completed knot and the extreme position to which the tucker finger passes in tucking the knot; Fig. 12 an elevation of a preferred supplement to the gatherer; Fig. 13 a sectional detail of a modified cradle; Fig. 14 a perspective of the modification shown in Fig. 13; Fig. 15 a detail of a supplemental bundle presser to insure proper operation of the gatherer, and Fig. 16 a perspective of a modified mounting for the gatherer.

In the drawings, 20 indicates a stationary semicircular holder to one end of which is pivoted a similar and mating semicircular holder 21, the two holders forming a circular track in which may be rotated two mating bundle forming rings 22, 22 provided, on their peripheries with teeth 23 meshing with a driving gear 24 said driving gear 24 being provided with a suitable driving train controlled by a clutch mechanism (not shown) carried by the time shaft 25, this construction being substantially the same as the similar construction found in my above mentioned patent and therefore needing no further description. The grain is delivered to the ring 22 which happens to be in holder 20, downwardly over a p¹ form 26, being driven over by means of the usual packer arms 27, the cradle 21 and the segment 22 therein being swung backward and down below the platform 26 as indicated in Figs. 2 and 9. In my prior patent I provided, for the purpose of temporarily detaining the flow of grain a long platform 26 to the holder, detaining fingers 30 carried by a rock shaft 28 and connected by an arm 29 and a link 31 with a cam 32. In such a construction I found, in practice, that, when the free end of the holder 21 swung upwardly from the position shown in Fig. 9, there was a possibility of a disarrangement of the straw upon the platform and therefore in order to avoid this difficulty I mount loosely upon shaft 28 a detaining finger 33 which normally lies below the platform 26, as shown in Figs. 2 and 9, and is provided with a bent portion 34 adapted to be engaged by a roller 35 carried by the free end of holder 21 so that, as the holder 21 starts upwardly from the position shown in Figs. 2 and 9, the detaining finger 33 will be quickly projected upward through slot 36 in platform 26 and thus push the grain backwardly away from the point of the cradle. Subsequently the detaining fingers 30 will be thrown up through platform 26 and an arm 37 carried by shaft 28 will engage finger 33 and hold it in its upwardly projectable position until holder 21 has been returned to the open position shown in Figs. 2 and 9.

The grain, as it is delivered to the ring 22 within the holder 20, is prevented from passing beyond the cradle by means of a pair of arms 38, 38 carried by a rock shaft 39 journaled in holder 20. Secured to shaft 39 is a pinion 41 meshing with a rack 42 which is connected to a bell crank 43 connected to a link 44 having a roller 45 arranged to be acted upon by a cam 46 on the shaft 25 so that arms 38 may be swung into position to prevent the straw from passing beyond the cradle, and thrown out of position so as to permit the ejection of the finished bundle. Cam 46 is provided with an intermediate portion 47 which acts upon roller 45 to momentarily throw the arms 38 toward the bundle beyond the normal position shown in Fig. 3 at the time when the holder 21 is being thrown over to embrace the bundle, in order to make sure that no straw lies between the mating ends of the two holder members and the mating ends of the two bundle embracing segments 22. When a sufficient quantity of grain has been delivered to holder 20 a trip arm 48 is depressed by the weight of the grain and operates, in the usual well known manner, to stop the packer arms and set in motion the binding mechanism. The earliest movement of the binding mechanism is the closing movement of the holder 21 and this is accomplished, as in the structure illustrated in my previous patent, by means of a pinion 51 connected to a rock shaft 52 to which the cradle 21 is attached. Pinion 51 has a mutilated portion meshing with a mutilated gear 53 and in practice I found that, with the forms shown in my prior patent, there was a possibility of breaking the teeth of pinion 51 when said pinion was driven in the opposite direction to return the holder 21 to its initial position. This was due to the fact that there was some difficulty in insuring the proper mesh between the pinion and its return gear and in order to obviate this difficulty I pivot at 54 a lever 55 one end of which is arranged in position to be engaged by a roller 35 carried at the free end of holder 21 and the other end of which is connected to a spring 57 which is of sufficient force to lift the weight of holder 21 a short distance as soon as any movement is permitted by reason of the form of the mutilated gears 51 and 53. As soon as the holder 21 has been thrown to the position shown in Fig. 1 gear 24 begins to rotate thus rotating the gear sections 22 within the holders 20 and 21 and thereby rotating the bundle of grain. During this rotation the gathering fingers 61 of the gathering head 62 withdraw, from the butt end of the bundle, successive wisps of straw and deliver the same to the rope forming twister head 63 in the manner fully described in my above mentioned patent thus forming, around the bundle, the rope 64 of straw from the butt ends of straw, the head ends being left in place in the bundle. The gathering and twisting mechanisms are substantially the same as those shown in my previous patent and they produce a satisfactory rope but, in practice, it sometimes happens that the butt ends of the straw in the bundle become somewhat twisted and misplaced and in order to avoid this slight difficulty I have provided a mechanism for engaging the butt ends of the straw at about the time they are engaged by the withdrawing finger 61 and holding said butt ends in alinement with the bundle. For this purpose I mount loosely upon the stud shaft 65 which carries the gathering head 62, an arm 66 at the outer end of which is journaled an idle sprocket wheel 67. Mounted on shaft 65, and partaking of the rotation thereof, is a sprocket wheel 68 and passing over the two sprocket wheels 67 and 68 is a chain 69 provided with a plurality of fingers 71 which project inwardly toward the axis of the bundle, the chain having a sufficient amount of slack to conform to the circumference of the bundle through a short arc. Arm 66 is journaled freely upon shaft 65 so that it, together with the chain 69, may be swung toward and from the bundle and for this purpose I provide the following mechanism. Secured to arm 66 is one end of a link 72 the other end of which is secured to a lever 73 carried by a rock shaft 74. Secured to rock shaft 74 is an arm 75 to which is secured one end of a link 76, the opposite end of said link carrying a roller 77 adapted to be engaged by a cam 78 carried by the time shaft 25. By this arrangement the chain 69 is moved at a speed which is just equal to the circumferential speed of the bundle and fingers 71 projecting into the bundle prevent the wisps of straw which are engaged by finger 61 from becoming twisted relative to the bundle until after they have been delivered to the mouth of the delivery head 63. Rotation of head 62 is produced by means of a shaft 79 connected to shaft 65 by a universal joint 81. Shaft 79 is connected by a universal joint 82 (see dotted lines Fig. 6) with a shaft 83 carrying sprocket wheel 84 connected by a sprocket chain 85 with a sprocket wheel 86 carried by a tubular shaft 87. The tubular shaft 87 is provided with a clutch 88 having a considerable number of teeth any one of which is adapted to receive a clutch finger 89 carried by a stem 91 projecting through shaft 87 and provided with a head 92 engaged by a cam 93 driven by gears 94 and 95 from the time shaft 25, a spring 96 serving to normally urge the clutch finger 89 into engagement with clutch 88 and the cam 93 determining the length of time of such engagement.

As in the previous devices above mentioned, the bundle is given one and a half revolutions and during this time the picker fingers 61 have delivered successive wisps of the butt ends of straws to the twister head 63 and that head has produced, around the bundle, the binding rope 64, the initial and final ends of which are overlapped, and the bundle is stopped in its movement so that the overlapped ends of the rope lie immediately above the knotter head 101. This head, in all essential particulars is like the knotter heads shown in my Patent No. 864,783 resembling more particularly the knotter head shown in Figs. 16 and 17 of that patent. This head is provided at its upper end with two pairs of grasping fingers 102 and 103 the pair 102 being arranged in position to grasp the initial end of the rope and the pair 103 being arranged in position to grasp the final end of the rope, said final end being retained within the twister head 63. These pairs of grasping fingers are opened and closed during the axial movement of the knotter head toward and from the bundle by means substantially the same as shown in my patent above mentioned and the movement of the knotter head toward and from the bundle is produced by means of a lever 104 which is controlled in its movement by means of a cam 105. The knotter head 101 is capable of rotation about its own axis one complete rotation and this rotation is produced by means of a pinion 106 splined upon the head 101. Meshing with pinion 106 is a rack 107 which, at the proper time, is given a sliding movement by means of a lever 108 having a pin 109 engaged by a cam 110. As previously stated this knotter head is substantially the same as the knotter head of my Patent No. 864,783 differing therefrom only in comparatively inessential details.

Instead of the tucking mechanism shown in my previous patent I have substituted a much simpler and single tucker which I shall now describe.

The present tucker comprises a tucker finger 112 having shallow pockets 113 and 114 adapted to engage the twisted portions 115 of the rope 64. This finger 112 is carried by a shaft 116 journaled in a suitable bracket 117 and provided with a gear 118 by means of which it may be given practically a complete rotation. Gear 118 meshes with a gear 119 carried by a shaft which also carries a gear 121 engaged by a mutilated gear 122 driven by a sprocket chain 123 from a clutch member 124, whereby the main rope around the bundle serves to hold the overtwisted ends against the bundle and thus hold them together. As soon as a tucking movement of the tucker finger has been completed gear 121 comes into engagement with the mutilated gear 127 which lies inside of gear 122, and is thus returned to its initial position. As soon as the rope 64 has been twisted and tucked, the holder 21 is returned to its open position in the manner already described and ejector fingers 131, like those shown in my previous patent, operate to eject the finished bundle from the machine.

Under some conditions of the straw there is a tendency, as the bundle is rotated, for the butt ends of those straws which are being withdrawn by the picker fingers to wrap around the shaft 63′ of the twister head 63 and in order to prevent this I journal upon said shaft 63′ a disk 151 provided with a sprocket wheel 152 over which runs a sprocket chain 153 from the sprocket wheel 154 carried by the countershaft 155. This countershaft carries the gear 156 which meshes with the gear 157 secured to shaft 63′ so as to rotate therewith, the construction therefore being such that disk 101 will be rotated upon shaft 63′ in a direction opposite to the rotation of said shaft. Secured to disk 151 is a twisted finger 158 which extends along shaft 63′ practically to the support of the twister head 63 so that, as the disk 151 is rotated the finger 158 will serve to prevent the straws from wrapping about shaft 63′ and will thus insure their free movement through the twister head.

When the bundle is being rotated during the production of the encircling straw band I have found that there is a tendency for the butts of the straw to drag in the sheet metal cradle or basin 161 which is provided to prevent the straw from passing down into the gearing and I have therefore deemed it advisable to withdraw this cradle from the butts of the straws to as great an extent as possible. For this purpose a portion of the cradle 161 at the butt end of the bundle is made in a separate piece 162 which is hinged at 163 on an axis parallel with the axis of the bundle and to the free end of this door 162 I attach one end of a lever 164 the opposite end of which is connected to an operating link 165 engaged by a cam 166 which is carried by the time shaft 25, the cam 166 being so proportioned, during the rotation of the bundle, that the door 163 will be drawn to the position indicated in dotted lines in Fig. 13, by a spring 167.

In some instances the picker head fails to extract a proper number of straws from the bundle because of the yielding of the bundle away from the picker head, and in order to avoid this difficulty either or both of the constructions shown in Figs. 15 and 16 may be adopted. In Fig. 16 the carrier 63″ for the twister head 63, instead of being rigid, is pivoted at 171 and normally urged toward the axis of the bundle by a spring 172. The position of the head 63″ is then controlled by means of a slotted link 173 attached to the arm 174 carried by shaft 74 so that the inward and outward movement of head 63″ will be coincident with the inward and outward movement of the carrier 66 of the chain 69, the slot in link 173 permitting a limited range of movement of head 63′ independent of the link so that the spring 172 will serve to keep the picker head 62 up against the bundle during the picker operation. As a further means for insuring a proper picking action of the picker fingers, either in conjunction with a stationary support for the twister head or with the construction shown in Fig. 16, the mechanism shown in Fig. 15 may be provided. For this purpose I provide a short stud shaft 181 parallel with the axis of the bundle and pivot upon said shaft an arm 182 which, at its outer end, carries an idler 183. Journaled on the stud shaft 181 is a double sprocket wheel 184 (i. e. a sprocket wheel capable of receiving two chains) and a chain 185 is passed over one portion of the sprocket wheel 184 and over the idler 183, this chain having projections 186 adapted to press into the bundle so as to keep the straws in alinement. Over the other portion of the double sprocket wheel 184 I pass a driving chain 187 which also passes over the sprocket wheel 188 carried by one of the shafts of the mechanism and so proportioned relative to the sprocket wheel 184 that chain 185 will be driven at a rate substantially equal to the circumferential speed of the bundle during the rope-forming rotation. Chain 185 is given a sufficient amount of slack to permit it to substantially conform to the curvature of the bundle, and in order to move the chain 185 toward and from the axis of the bundle I attach to arm 182 one end of a link 191 the opposite end of which is engaged by a cam 192 carried by the time shaft 25. The link 191 is preferably formed in two parts with an interposed spring 193 so that the chain 185 may be urged toward the bundle by a yielding force. By means of this construction the bundle, during its rope-forming rotation, will be pushed toward the picker head 62 so as to insure a proper withdrawal of straws by the picker head.

In the principal figures of the drawing (more especially Fig. 1), I have shown fingers 38 for engaging the straw just prior to the closing of the ring 22 so that no straws will be caught between the mating ends of the two parts of the ring. In practice I find that there is some difficulty in getting these fingers 38 out of the path of movement of the bundle which is being ejected and I have therefore substituted, for shaft 39, a shaft 194 (Fig. 14) which I place above the bundle-forming mechanism on the side opposite the side where shaft 39 was placed and to this shaft 194 I attach fingers 195 (shown very much foreshortened in Fig. 14) which are so formed that they may be thrust down on top of and across the mass of straw in cradle 161 so as to draw the straw back a little from the ends of the sections of the ring 22 when the holder 21 is thrown over into bundle-forming position. This shaft 194 is provided with an arm 196 by means of which it may be operated intermittently by a cam (not shown) carried by time shaft 25.

I claim as my invention:

1. In a straw binding harvester, the combination of bundle receiving and rotating means, a twister structure adapted to receive straws from the circumference of the bundle, picker mechanism delivering straw from the circumference of the bundle to the twister, straw alining members arranged to engage the straws adjacent the picker mechanism, and means for moving said straw alining members at substantially the circumferential speed of the bundle.

2. In a straw binding harvester, the combination of bundle receiving and rotating means, a twister structure adapted to receive straws from the circumference of the bundle, picker mechanism delivering straw from the circumference of the bundle to the twister, straw alining members arranged to engage the straws adjacent the picker mechanism, means for moving said straw alining members at substantially the circumferential speed of the bundle, and means for moving said straw alining members into and out of operative position.

3. In a straw binding harvester, the combination of bundle receiving and rotating means, a twister structure adapted to receive straws from the circumference of the bundle, picker mechanism delivering straw from the circumference of the bundle to the twister, an endless chain movable in a plane substantially at right angles to the bundle axis, straw engaging fingers carried by said chain, and means for driving said chain at substantially the circumferential speed of the bundle.

4. In a straw binding harvester, the combination of bundle receiving and rotating means, a twister structure adapted to receive straws from the circumference of the bundle, picker mechanism delivering straw from the circumference of the bundle to the twister, an endless chain movable in a plane substantially at right angles to the bundle axis, straw engaging fingers carried by said chain, means for driving said chain at substantially the circumferential speed of the bundle, and means for moving said chain into and out of operative relation with the bundle.

5. In a straw binding harvester, the combination of a bundle receiving and rotating mechanism, of rope forming mechanism arranged to receive straw from the circumference of the bundle and form the same into a rope encircling the bundle, twister mechanism arranged to engage the overlapping ends of the rope and twist the same upon themselves about an axis substantially radial to the bundle, and a tucker arm arranged to engage the twisted ends of the rope at the twister mechanism and carry the same toward the bundle and tuck them between the main portions of the rope and the bundle.

6. In a straw binding harvester, the combination of a bundle receiving and rotating mechanism, of rope forming mechanism arranged to receive straw from the circumference of the bundle and form the same into a rope encircling the bundle, twister mechanism arranged to engage the overlapping ends of the rope and twist the same upon themselves about an axis substantially radial to the bundle, a tucker arm carried upon an axis substantially at right angles to the axis of the bundle arranged to engage the twisted ends of the rope at the twister mechanism and carry the same toward the bundle and tuck them between the main portions of the rope and the bundle, and means for rotating said tucker arm about its axis.

7. In a straw binding harvester, the combination of a bundle former comprising a pair of substantial semi-circular segments, means for swinging one of said segments relative to the other to open and close the bundle forming mechanism, a straw platform leading to one of said segments over the open position of the other, a straw retarding finger 33 arranged adjacent said straw platform, and means connected with the movable segment to engage and operate said straw retarding finger.

8. In a straw binding harvester, the combination with means for rotating a bundle of straw, of picker mechanism coöperating with the bundle to extract straws therefrom, and means for yieldingly urging said picker mechanism toward and from the axis of the bundle.

9. In a straw binding harvester, the combination with means for rotating a bundle of straw, of picker mechanism coöperating with the bundle to extract straws therefrom, and a member arranged to engage the bundle opposite the picker and hold the same into engagement with the picker.

10. In a straw binding harvester, the combination with means for rotating a bundle of straw, of picker mechanism operating with the bundle to extract straws therefrom, means for yieldingly urging said picker mechanism toward and from the axis of the bundle, and a member arranged to engage the bundle opposite the picker and hold the same into engagement with the picker.

11. In a straw binding harvester, the combination with means for receiving and rotating the bundle of straw, of a picker adapted to extract straws from the bundle as it rotates, and means for moving the picker toward and from the axis of the bundle.

12. In a straw binding harvester, the combination with means for receiving and rotating the bundle of straw, of a picker adapted to extract straws from the bundle as it rotates, a chain 185 arranged to engage the bundle in opposition to the picker, means for driving said chain in the direction of rotation of the bundle, and means for moving said chain toward and from the axis of the bundle.

13. In a straw binding harvester, the combination with means for receiving and rotating the bundle of straw, of a picker adapted to extract straws from the bundle as it rotates, means for moving the picker toward and from the axis of the bundle, a chain 185 arranged to engage the bundle in opposition to the picker, means for driving said chain in the direction of rotation of the bundle, and means for moving said chain toward and from the axis of the bundle.

14. In a straw binding harvester, the combination with a bundle receiver and means for rotating said bundle receiver to rotate the bundle, of a cradle arranged in conjunction with said bundle receiver, said cradle comprising a movable member opposite the butt of the bundle, and means for moving said movable member toward and from the axis of the bundle, for the purpose set forth.

15. In a straw binding harvester, the combination with a rotatable bundle holder, of picker mechanism for extracting straws from the bundle, a twister head arranged to receive the extracted straws from the picker, and a guard comprising a finger extending longitudinally of the twister shaft and revolubly about said shaft, and means for revolving said guard finger about the twister shaft.

16. In a straw binding harvester, the combination with a rotatable bundle holder, of picker mechanism for extracting straws from the bundle, a twister head arranged to receive the extracted straws from the picker, and a guard comprising a finger extending longitudinally of the twister shaft and revolubly about said shaft, and means for revolving said guard finger about the twister shaft in a direction opposite to the direction of rotation of the twister.

17. In a straw binding harvester, the combination with a rotatable bundle holder, of picker mechanism arranged to extract straws from a bundle, a twister shaft and head arranged to receive the straws from the picker mechanism, a carrier journaled upon said twister shaft, a finger 158 carried by said carrier and means for rotating said carrier upon the twister shaft.

18. In a straw binding harvester, the combination with a rotatable bundle holder, of picker mechanism arranged to extract straws from a bundle, a twister shaft and head arranged to receive the straws from the picker mechanism, a carrier journaled upon said twister shaft, a finger 158 carried by said carrier and means for rotating said carrier upon the twister shaft in a direction opposite to the rotation of the twister shaft.

In witness whereof, I have hereunto set my hand and seal at Indianapolis, Indiana, this thirtieth day of September, A. D. one thousand nine hundred and nine.

HARRY A. HANCOCK. [L. S.]

Witnesses:
ARTHUR M. HOOD,
THOMAS W. MCMEANS.

Copies of this patent may be obtained for five cents each, by addressing the "Commissioner of Patents, Washington, D. C."